Aug. 9, 1960

R. LUTHI 2,948,165

VARIABLE SPEED GEAR REDUCTION UNIT

Filed April 13, 1959

Inventor:
Robert Luthi
By Kenneth T. Snow
Atty.

Aug. 9, 1960 R. LUTHI 2,948,165
VARIABLE SPEED GEAR REDUCTION UNIT
Filed April 13, 1959 3 Sheets-Sheet 2

Inventor:
Robert Luthi
By:
Kenneth T. Snow
Atty.

Aug. 9, 1960  R. LUTHI  2,948,165
VARIABLE SPEED GEAR REDUCTION UNIT
Filed April 13, 1959  3 Sheets—Sheet 3
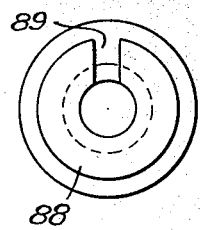
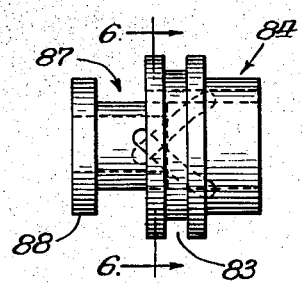
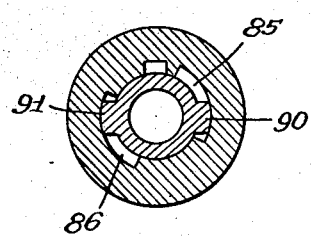
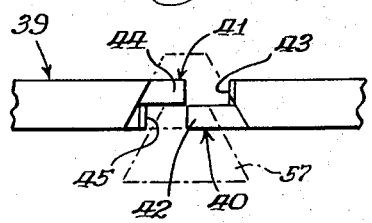
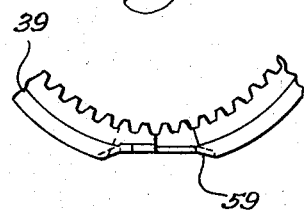
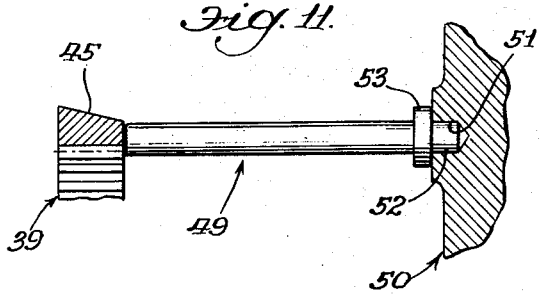
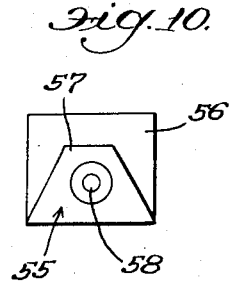
Inventor:
Robert Luthi
By Kenneth D. Snow
Atty.

United States Patent Office 2,948,165
Patented Aug. 9, 1960

2,948,165

VARIABLE SPEED GEAR REDUCTION UNIT

Robert Luthi, Plantation, Fla., assignor of forty percent to Kenneth T. Snow, Wheaton, Ill.

Filed Apr. 13, 1959, Ser. No. 805,803

20 Claims. (Cl. 74—804)

This invention relates to a new and improved variable speed gear reduction unit. The present device is an improvement over the gear reduction unit shown in my Patent 2,825,244 entitled Positive Control Variable Speed Gear Reduction Unit.

There have been many types of adjustable speed gear reduction units built, but these units invariably required the use of numerous gears of various sizes and including complex shifting means for effecting the interengagement of various of these gears to accomplish different gear ratios. My earlier patent contemplated a variable speed gear reduction unit of an epicyclic gear train type in which a planet gear cooperated with a multilated ring gear of variable effective pitch diameter. The planet gear was provided with an adjustable orbit by means of relatively adjustable eccentric members. In this earlier patent the adjustable ring gear was in the form of multiple segments wherein each of the segments had to be separately moved to accomplish a change in setting of the size of the ring gear.

It is therefore a principal object of the present invention to provide a ring gear with an adjustable pitch diameter and said ring gear including a split ring member with means to effectively expand or contract the split ring member to gain any size ring gear within a predetermined range for the purpose of accomplishing an epicyclic gear reducer with a positively controlled output.

An important object of this invention is the provision of means in a positively controlled variable speed gear reduction unit to enable a single control to simultaneously adjust the pitch diameter size of a split ring gear and to correspondingly adjust the eccentric path about which a planet gear may orbit to properly engage the newly adjusted pitch diameter size of the ring gear.

Another important object of this invention is to employ an internally toothed outer split ring gear having its outer circumference tapered laterally thereacross for cooperation with an annular ring member tapered laterally across its inner circumference to effect a contraction of the split ring gear of this invention when the annular ring member is moved across the split ring gear.

Another and further important object of this invention is to supply a split ring gear in which the split portion is not a straight split but rather an offset of cooperating L-shaped ends whereby the ring may be expanded or contracted a substantial amount and still have portions of the L legs overlapping.

Another and still further important object of this invention is to provide a split ring gear for use in a gear reduction unit of the epicyclic gear train type having a planet within the ring gear and having means in the device for maintaining the split ring gear in its adjusted position by cooperative annular wedging members and a complementary key type wedge member for maintaining the split ring gear in maximum extension and out against its circumferential support over the full surface thereof.

Another important object of this invention is to provide a planet gear mounted on and over interrelated eccentric members which when rotated relative to one another causes the eccentric orbital path of the planet to be changed.

Another and still further important object of this invention is to supply a flexible split ring gear having its cross section so arranged that an even, uniform contraction and expansion is obtained in order to maintain a true circumference of the ring gear on each ratio setting.

Another important object of this invention is the provision of means in an epicyclic gear train composed of an internal planet gear and an outer reaction ring gear wherein the ring gear is mutilated by a splitting in one location to make it capable of expanding or contracting to various adjustable pitch diameters.

Still another important object of this invention is to equip a gear transmission of the type having a planet gear and superimposed ring type reaction gear wherein the ring gear comprises a split member and is adjustable by spreading or contracting to effect various pitch diameters to thereby accomplish correspondingly varying drive ratios between the input and the output of the transmission.

A still further important object of this invention is to provide a variable speed gear reduction unit of the epicyclic gear train type wherein there is a single operating control member to simultaneously positively adjust the desired spread of the split ring gear and to regulate a cooperative eccentric orbit of the planet gear arranged and constructed to travel around within the adjustable split ring gear.

Other and further important objects and advantages will become apparent from the disclosures in the following specification and acompanying drawings.

In the drawings:

Figure 5 is an elevational view of a portion of the eccentric adjusting mechanism of the gear reducer of this invention.

Figure 6 is a sectional view taken on the line 6—6 of Figure 5.

Figure 7 is an end elevational view of the device of Figure 5.

Figure 8 is an outside view of the split ring ends shown spread to their maximum extension.

Figure 9 is a side elevational view of the split ring ends as shown in Figure 8.

Figure 10 is a plan view detail of the split ring key wedge of this invention.

Figure 11 is a detail view partially in section of the shoulder pins employed in this gear reducer.

As shown in the drawings:

Figure 1:
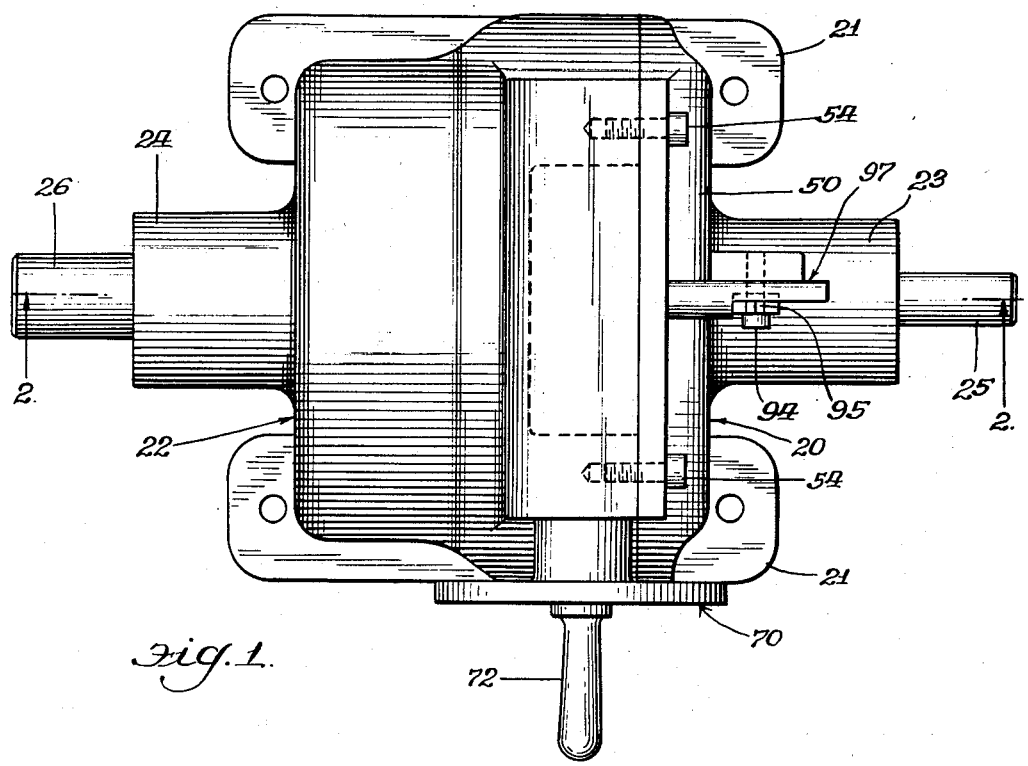
Figure 1 is a top plan view of the variable sped gear reduction unit of this invention.

The reference numeral 20 indicates generally a frame supporting structure including a base 21 and a housing 22 extending upwardly from the base and constituting an enclosure for the gear reduction unit of this invention. The housing 22 is formed with a tubular hub member 23 at one end and a corresponding and axially aligned spaced apart tubular hub member 24 at the other end. An input drive shaft is shown at 25 journally mounted within the hub member 23 in the housing 22. Similarly a driven shaft or the output shaft of this gear reduction unit is shown at 26 and is axially aligned with the input shaft but spaced apart therefrom and is journaled within the hub member 24 of the housing 22. There is no drive between the input drive shaft and the output driven shaft except through the gear reduction mechanism of this invention. However, the shafts are axially aligned and in fact the drive shaft has an outer extension 27 somewhat in the nature of a pilot which is journally mounted within a socket-like aperture 28 within the end of the driven shaft 26. A sleeve like bearing member 29 is disposed intermediate the pilot extension 27 and the aperture socket 28 to provide for free journaling of the drive shaft within the end of the driven shaft.

A sleeve member 30 having an annular flange 31 at its inner end surrounds the input drive shaft 25 and is anchored within the hub 23 by means of the outwardly extending annular flange 31.

The drive shaft 25 is equipped with an integral eccentric 32 at its inner end just inwardly of the pilot extension 27. An eccentric sleeve 33 is journally positioned over the eccentric boss 32 on the shaft 25 and is held in position with a pin 34 extending transversely inwardly of the eccentric sleeve and having an enlarged head 35 disposed within a notch to be subsequently described. A planet gear 37 with a bushing 38 therewithin is free to turn on the eccentric sleeve 33. It will thus be apparent that the orbit motion of the planet gear 37 is adjustable by the relative positioning of the eccentric sleeve 33 on the eccentric 32 forming part of the drive shaft 25. The planet gear 37 having an adjustable orbit may thus be adjusted to complement the variable pitch diameter of a reaction ring gear to be subsequently described.

A ring or reaction gear 39 is a discontinuous generally annular one piece member with internal gear teeth and having its diameter adjustable by reason of the discontinuous nature thereof. The discontinuous ring gear 39 of this invention comprises a split ring which as shown in Figures 8 and 9 has endings 40 and 41. The endings 40 and 41 may be considered as L shaped and are arranged to provide for a limited amount of overlapping of the split ring ends so that even though the ring 39 is split is may have substantial adjustment without the ends 40 and 41 being completely separated. This insures a full circumferential surface of gear teeth regardless of the adjustment of the ring. The L-shaped ending 40 includes a leg or continuation 42 of the ring which is approximately only half the width of the main body portion of the arcuate ring gear 39, and a base 43 completes the L. Similarly the L-shaped ending 41 includes a narrow arcuate extension 44 and a base 45. The endings are arranged so that their leg members 42 and 44 slidably overlap each other and are such that their lateral extent are substantially equal to and in alignment with the respective bases of the opposite endings. Thus the leg portion 42 of the L-shaped ending 40 is in alignment with the base 45 of the L-shaped ending 41 and similarly the leg member 44 of the L-shaped member 41 is in alignment with the base portion 43 of the L-shaped ending 40. In Figures 8 and 9 the ring 39 is shown in its fully extended position.

It should be apparent that the cooperation of the planet gear 37 with the ring gear 39 constitutes an epicyclic gear train and by reason of the combination of the adjustable orbiting of the planet gear 37 and the adjustable pitch diameter of the split ring gear 39 there is produced a variable speed reduction unit. The internal annular split ring gear 39 may be adjusted by contracting to provide for one or two less gear teeth than that shown in the maximum number of teeth in the ring gear in its position as shown in Figure 9. Obviously, however, the number of teeth adjustment in any ring gear may vary depending on such factors as the size of the teeth and the length of the overlapping legs 42 and 44.

The outer annular circumference 45 of the split ring 39 is angled or tapered from a low point on the inside of the ring (shown on the right in Figure 2) to a high upper point on the outside of the ring. The inclination or taper of the outside circumference of the split ring gear 39 is a relatively small acute angle. This angle may be considered to be in the range of a wedging angle for a reason now to be described. A ring member 46 mounted within the housing 22 and disposed around the outside of the split ring gear 39 is provided with an internal annular inclined or tapered face 47. The tapered face 47 of the ring 46 is positioned in the housing 22 for sliding contact with the tapered surface 45 of the split ring 39 and is the means for causing a contraction of the split ring gear 39 and a movement of the L-shaped ends 40 and 41 into overlapping relationship when the ring member 46 moves longitudinally of an axis taken through the driving and driven shafts of the gear reduction device of this invention. The angle of inclination of the face 47 of the ring 46 is for all intents and purposes the same as the angle of inclination of the outer face 45 of the split ring gear 39. These inclined faces cooperate with each other such that when the ring member 46 moves longitudinally through the housing 22 the ring gear 39 may have its pitch diameter changed. When the ring 46 moves outwardly or to the left, as viewed in Figure 2, the split ring gear 39 will contract causing an overlapping of the legs 42 and 44. The degree of overlapping of the legs 42 and 44 will vary directly with the amount of movement of the ring 46. The complementary angles of the mating faces 45 and 47 of the ring gear 39 and ring member 46 respectively create a wedging condition such that when the ring 46 is confined within the housing 22 and the split ring gear 39 is fixed in a lateral position within the housing by reason of a spacer ring 48 on one side and by four generally evenly spaced shoulder pins 49 on the other side there is no tendency whatever for the split ring gear 39 or its holding outer wedging ring 46 to move relative to each other without actuation by an operator as will later be described. The shoulder pins 49 are supported in a removable end cover 50 for the housing 22 as best shown in Figure 11. The cover 50 is provided with sockets 51 which receive end portions 52 of the shoulder pins 49. Adjacent to the ends 52 the pins have enlarged collars or shoulders 53 abutting the inner surface of the cover 50 adjacent the socket 51. It will thus be apparent that the split ring gear is held in laterally fixed position as it is confined between the spacer ring 48 and the four shoulder pins 49, but is free to expand or contract to a diameter required to obtain a desired speed ratio. A plurality of cap screws 54 are arranged and constructed to hold the removable cover 50 in fixed relationship relative to the remaining housing 22 of the gear reduction unit of this invention.

A tapered key 55 is fastened by means of a screw 36 to the ring member 46. The tapered key as shown in detail in Figure 10 has a rectangular base member 56 and a tapered element 57 which is raised upwardly from the base 56. An aperture 58 passes through the tapered key 55 and is adapted to receive the screw 36 for fastening of the key to the ring member 46. Obviously any number of screws could be employed to hold the tapered key to the ring 46 or similarly other fastening means could be employed equally successfully. As best shown in Figure 9 the external portion of the split ring 39 is notched or cut out at the bottom thereof as shown at 59 and the notch 59 is substantially identical in shape to the tapered key portion 57 of the member 55. It should be understood that the tapered key fastened to the ratio adjusting ring 46 would at all times force the external tapered surface of the split ring gear outwardly to be tightly pressed against the tapered circumference of the adjusting ring 46, as clearly shown in Figures 2 and 4.

Figure 2:
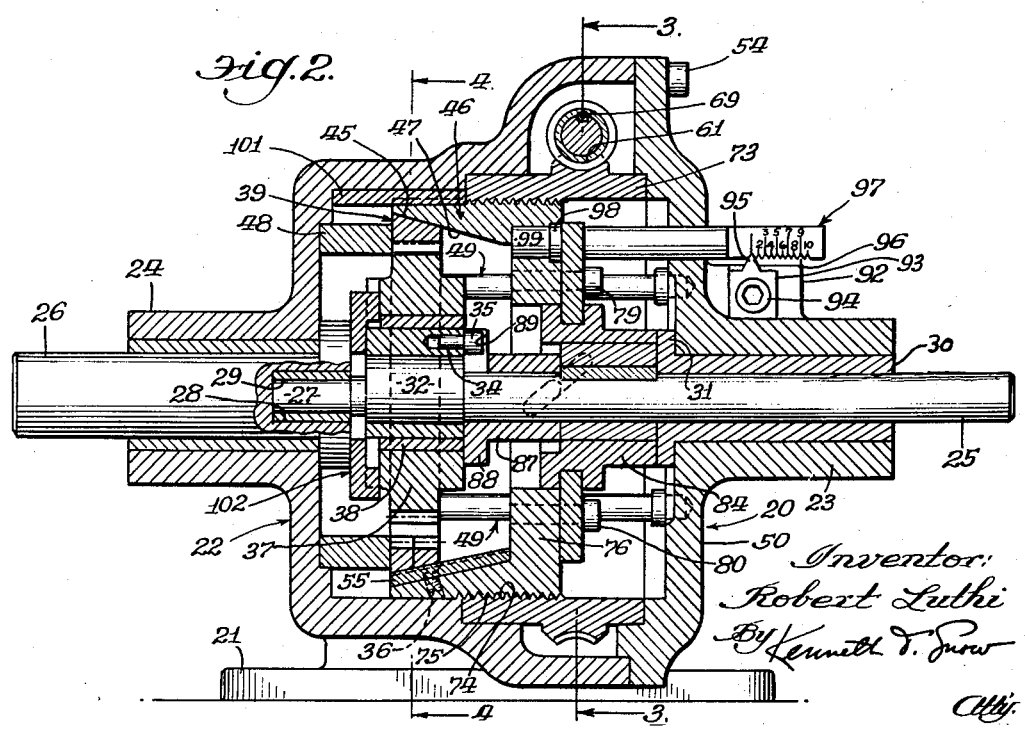
Figure 2 is a sectional view taken on the line 2—2 of Figure 1.
Figure 3:
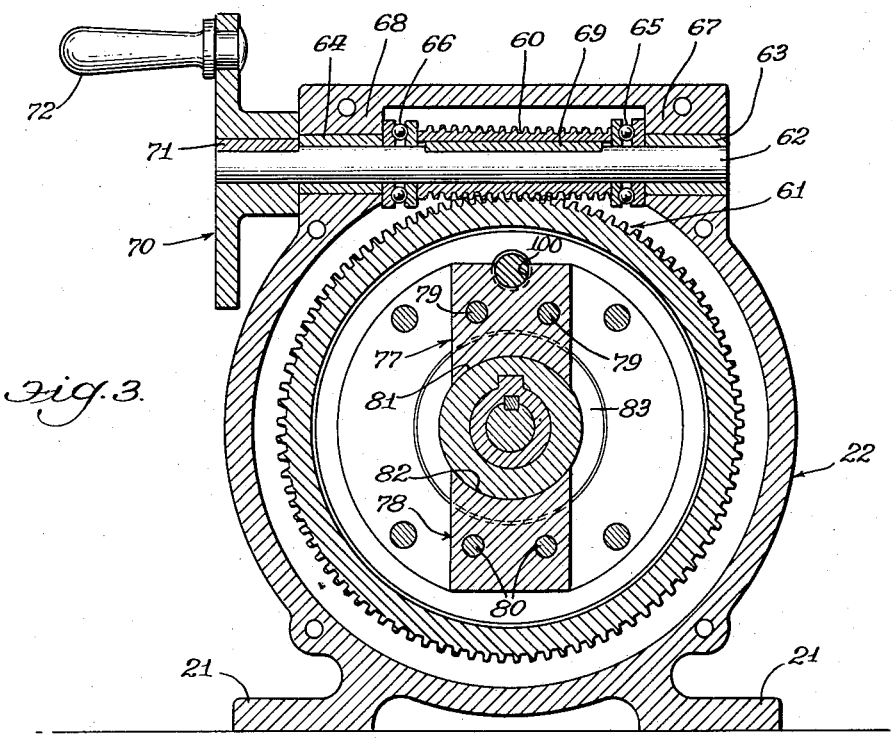
Figure 3 is a sectional view taken on the line 3—3 of Figure 2.

The split ring 39 is expanded or contracted indirectly through the operation of a worm 60 and worm gear ring 61 which is best shown in Figures 2 and 3. The worm 60 is carried on a shaft 62 which is journalled in spaced apart aligned sleeve bearings 63 and 64 mounted in the housing 22 above the ring gear 39 and its actuating spreading member 46. Spaced apart bearings 65 and 66 confine the worm 60 on a central part of the shaft 62 between generally vertically spaced portions 67 and 68 of the housing 22. A key or the like 69 locks the worm 60 to the shaft 62 so that as the shaft 62 is rotated the worm 60 will be similarly rotated. A hand wheel 70 is keyed at 71 to the shaft 62 and by means of a hand engaging member 72 the wheel 70 may be readily rotated to effect a turning of the shaft 62 and thus also the worm 60. The worm gear 61 forms part of a relatively broad ring member 73 which has internally formed threads 74 over a substantial portion thereof. Similarly the ring member 46 is provided with external threads 75 to engage the internal threads 74 on the ring member 73. As the hand wheel 70 is rotated the worm 60 rotates the worm ring gear 61 thereupon causing a lateral shifting of the member 46 relative to the broad ring member 73. Thus there is accomplished an expansion or contraction of the split ring gear 39.

Movement of the ring member 46 in a lateral direction or a direction longitudinally of the driving and driven shafts further accomplishes a change in the orbit of the planet gear 37. The change in planet gear's orbit is proportional to the change in the fixed diameter of the split ring gar 39. The ring member 46 includes a generally radially inwardly extending annular flange 76. Generally diametrically opposed plate members 77 and 78 are attached by means of cap screws 79 and 80 respectively to the flange 76 of the ring 46. Each plate member 77 and 78 is provided with an arcuate shaped inner face 81 and 82 to enable the plate members to engage opposite sides of an annular groove 83 within a sleeve like ring member 84 as best shown in Figure 5. It is thus apparent that as the ring member 46 with its integral inwardly extending annular flange 76 is moved laterally the plate members 77 and 78 will simultaneously move in a lateral direction carrying with it the sleeve member 84. This sleeve like member 84 is best shown in Figures 5 and 6 and in addition to the external annular groove 83 there is provided therein spirally shaped or generally angled slots or apertures 85 and 86. Another sleeve member 87 is positioned over the drive shaft 25 and within the sleeve member 84. The internally positioned sleeve 87 has an enlarged outwardly extending annular flange 88. As best shown in Figure 7 the flange 88 is interrupted with a notch or space 89 to receive the head 35 of the eccentric sleeve holding pin 34. Thus when the internal sleeve 87 with its flange 88 is rotated it will carry with it the head 35 of the pin 34. The engagement of the eccentric sleeve member 33 by the pin 34 causes a rotation of that eccentric sleeve relative to the eccentric embossed portion 32 of the drive shaft 25 thereby changing the orbital path of the planet gear 37.

The internal sleeve 87 is provided with externally projecting pin like members 90 and 91 to engage respectively the spiral grooves or slots 85 and 86 within the sleeve member 84. Thus the construction is such that when the member 84 is moved longitudinally of the drive shaft 25 the spiral or angularly shaped grooves 85 and 86 cause a turning of the pins 90 and 91 to effect a rotation of the inner sleeve member 87 and thus an adjustment of the orbital path of the planet gear 37 is obtained simultaneously with the adjustment of the pitch diameter of the split ring gear 39.

A boss 92 is provided on the hub 23 and holds a removable pointer member 93 by means of a cap screw or the like 94. The pointer element 93 includes a V-shaped or pointed projection 95 arranged and constructed to engage V-shaped notches 96 in a rod like member 97 which is movable laterally or longitudinally of the driving and driven shafts by reason of its engagement with the ring member 46 which in turn, as previously described, is moved longitudinally of the housing 22 by reason of the worm and worm gear operation. The position of each of the V-shaped notches 96 in the outer end of the rod 97 is calibrated to provide for various gear drive ratio settings. In other words, when the V-shaped pointer 95 engages the notch 1, such as shown in Figure 2, there will be a definite driving relationship between the driving and the driven shafts, and similarly when the V-shaped pointer 95 is in one of the other V-shaped notches there will be another definite and precise driving ratio between the driving and driven shafts. It should be apparent that the V notches and their indicia set opposite thereof are calibrated to give predetermined driving ratios between the driving and driven shafts 25 and 26 respectively of this gear reducing mechanism. In order to change any setting in the device as shown it is necessary to loosen the cap screw 94 and thereafter turn the hand wheel 70 by means of the handle 72 to cause the worm 60 to drive the worm gear 61. This in turn automatically and cooperatively changes the pitch diameter of the mutilated or split ring gear 39 and the orbital path of the planet gear 37 by reason of the relative movement of the eccentric sleeve 33 with respect to the eccentric portion 32 on the shaft 25. When one of the desired notches 96 is opposite the V pointer 95 and it is desired to hold that relationship of ratio between driving and driven shafts then the cap screw 94 is tightened causing a locking of the calibrated rod 97 relative to the housing 22. When the gauge rod is so locked further adjustment of the device is prohibited until such time as the pointer member 93 is loosened by loosening of the cap screw 94. The particular pointer 93 shown herein is only one means for holding a fixed adjustment of the rod and it should be understood any spring detent could be equally well employed.

The calibrated rod 97 is provided with an enlarged shoulder 98 and a short stub like end 99 which is carried in the inwardly extending annular flange 76 of the ring member 46. The outer edge of enlarged shoulder or collar 98 abuts the plate member 77 and is held thereby. This construction is clearly shown in Figure 3 wherein a semi-circular notch 100 in the plate 77 permits the passage of the calibrated rod 97 but provides a surface against which the outer periphery of the collar 98 may abut and be properly held against separate longitudinal movement thereof. The rod is preferably calibrated in increments such that each adjustment thereof will constitute a full tooth adjustment for the split gear rather than a partial tooth.

Figure 4:
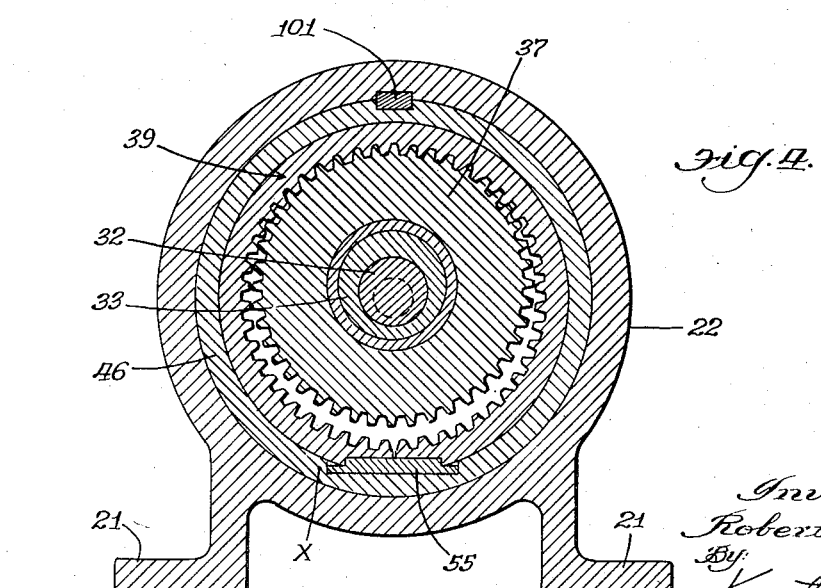
Figure 4 is a sectional view taken on the line 4—4 of Figure 2.

In the operation of the device of this invention the multilated or split ring gear 39 as shown in Figure 4 may have its pitch diameter varied by reason of movement of the wedging outer ring 46 and the wedging key member 55 engaging the outer circumference and the ends of the split ring respectively. The key 55 which is shown in detail in Figure 10 and has previously been described is employed principally to cause a complete spreading of the split ring 39 around its full circumference. As long as the split ring 39 is completely spread outwardly against its backup or retaining ring 46 it will have a true round circumference within which the planetary gear 37 may react in its particular eccentric orbital path as created by reason of the relative positioning of the eccentric sleeve 33 with the eccentric portion 32 on the shaft 25. The adjustment of the split ring gear should not be such that only a part of a tooth is presented to the planet gear. It should be understood that for every operable setting of the gearing the split ring gear must have a whole number of teeth. The gear reducer of this invention is not an infinitely variable gear reduction unit, but rather the number of ratios for each unit are predetermined for every particular split ring gear. It is obvious that the number of ratios available for the epicyclic gearing depends on the amount of contraction and expansion the split ring may have in numbers of whole teeth. However, any number of ratios may be multiplied merely by combining the device with a set or sets of spur gears. The split ring gear will at all settings thereof have a true circumference and permit the gearing to produce a uniform motion with no pulsation to the driven or output shaft.

A straight key 101 as best shown in Figures 2 and 4 guides the movement of the ring member 46 longitudinally of the shafts 25—26 and prevents rotation thereof. Rotation of the worm causes the worm gear and its broad ring member 73 to be rotated. The interengaging threads 74 and 75 provide for the lateral separate movement of the ring member 46 while the key 101 holds it against rotation.

The planet gear 37 is the driven member of this epicyclic gear train and hence the rotational drive therefrom must be transmitted to the driven shaft 26. Obviously this may be done in any one of a number of ways by employing various types of couplings therebetween. The device shown in the drawings is an Oldham coupling indicated at 102. The Oldham coupling is an old and well known means for transmitting eccentric rotary motion to a shaft or other member to be driven. Broadly speaking in the operation of the device of this invention rotational drive is delivered to the drive shaft 25 and its integral eccentric member 32 whereupon drive is delivered outwardly to the eccentric sleeve 33 disposed over the eccentric portion 32. As previously described the relative positioning of the sleeve 33 with respect to the eccentric portion 32 on the shaft will enable a full range of orbit adjustment for the planet gear 37. The planet is mounted on a sleeve bushing 38 which is carried on the eccentric sleeve 33. Now as previously stated the planet gear 37 is in fact the driven member of this invention and its rotary motion is carried by the Oldham coupling 102 to the driven shaft 26. Merely changing the orbit of the planet gear 37 alone will of course not effect a change in the output to the driven shaft 26. However, the planet gear 37 cooperates with the mutilated or split ring gear 39 to provide for a positive control variable speed reduction unit. This reaction split ring gear 39 is capable of having its pitch diameter changed by the combined wedging action of the ring 46 and the tapered or wedging key 55.

The device of this invention effectively provides positive drive ratios between input and output shafts. The adjustments necessary to change the orbital path of the planet and the pitch diameter of the mutilated reactance ring gear are accomplished simultaneously and by a single combined control member.

I am aware that numerous details of construction may be changed without departing from the principles disclosed herein and I therefore do not propose limiting the patent granted hereon otherwise than as necessitated by the appended claims.

What is claimed is:

1. A gear reduction unit comprising a housing, a planet gear mounted in said housing, adjustable eccentric means disposed in said housing and arranged to drive said planet gear, said adjustable eccentric means arranged and constructed to vary the orbit of travel of said planet gear, said adjustable eccentric means constituting the driver member of this gear reduction unit, a one piece split ring reaction gear mounted in said housing and in meshing engagement with said planet gear, and means varying the effective pitch diameter of said one piece split ring reaction gear.

2. A device as set forth in claim 1 in which there is included single control means for simultaneously varying the pitch diameter of the one piece split ring reaction gear and coordinating the varying of the orbital path of the planet gear.

3. A device as set forth in claim 1 in which the means for varying the effective pitch diameter includes means for expanding and contracting the one piece split ring gear.

4. A device as set forth in claim 3 in which the means for expanding and contracting the one piece split ring gear includes a tapered ring member movable in cooperation with said split ring gear and said split ring gear having a tapered outer circumferential surface complementing said tapered ring member.

5. A device as set forth in claim 4 in which there is included a tapered key fastened to said tapered ring member and said tapered key arranged and constructed to engage between the ends of the one piece split ring reaction gear simultaneously with the engagement of the outer circumferential surface of the one piece split ring reaction gear by the tapered ring member.

6. A device as set forth in claim 1 in which there is included cooperative means between the adjustable eccentric means and the one piece split ring reaction gear to effect a correlated movement of the adjustable eccentric means and the one piece split ring reaction gear simultaneously.

7. A device as set forth in claim 6 in which the cooperative means includes a ring member disposed in said housing, means moving said ring member laterally in said housing, said ring member having a tapered portion engaging the outer circumference of the one piece split ring reaction gear and having another inwardly projecting portion, means operating said adjustable eccentric means, and means joining said inwardly projecting portion with said means operating said adjustable eccentric means for actuation thereof.

8. A device as set forth in claim 7 in which said means operating said adjustable eccentric means comprises concentric sleeve members, the outer of said sleeve members having a spiral slot in its cylindrical wall and an annular external groove arranged to receive means associated with said inwardly projecting portion of said ring member for effecting joint lateral movement of said members, and the inner of said sleeve members having an outwardly extending projection for engagement in the spiral slot in the outer of said sleeve members.

9. A device as set forth in claim 8 in which the inner of said sleeve members has an outwardly projecting annular flange at one end thereof which is disposed closely adjacent the adjustable eccentric means, said annular flange having a notch therein, said adjustable eccentric means including an eccentric sleeve, a pin fixed in the side of said eccentric sleeve and arranged to loosely engage the notch in said annular flange whereby when said ring member is moved laterally in said housing it simultaneously adjusts the pitch diameter of the one piece split ring reaction gear and the orbital path of the planet gear.

10. A device as set forth in claim 9 in which the means moving the ring member laterally includes a worm and worm gear drive.

11. A device as set forth in claim 10 in which there is included a straight key between said ring member and said housing, and screw threads interposed between a portion of said ring member and said worm gear, whereby the ring member is prevented from rotating but may move laterally in said housing.

12. A device as set forth in claim 6 in which the means for actuating both members includes cooperative worm and worm gear members carried in said housing and arranged and constructed to move a tapered ring member toward and away from said one piece split ring reaction gear and said tapered ring member having means thereon for effecting rotation of the adjustable eccentric means.

13. A device as set forth in claim 1 in which said one piece split ring reaction gear is equipped with overlapping side-by-side extensions.

14. An epicyclic gear train comprising a housing, an eccentric driver, a planet gear driven by said eccentric driver, a split ring reactance gear surrounding said planet gear and in meshing engagement therewith, said split ring reaction gear including a single ring member split at one location, means adjusting the pitch diameter of said split ring reactance gear, a driven shaft, and coupling means joining said planet gear with said driven shaft.

15. A device as set forth in claim 14 in which there is included an eccentric sleeve mounted over said eccentric driver and within said planet gear, and means rotatably adjusting said eccentric sleeve relative to said eccentric driver to vary the orbital path of the planet gear.

16. A device as set forth in claim 15 in which there is included single control means for actuating both of said means, which single means simultaneously and proportionately adjusts the pitch diameter of the split ring reactance gear and the orbital path of the planet gear.

17. A gear reduction unit comprising a housing, a planet gear mounted in said housing, means driving said planet gear, means arranged and constructed to vary the orbit of travel of said planet gear, a one-piece split ring reaction gear mounted in said housing and in meshing engagement with said planet gear, and means varying the effective pitch diameter of said split ring gear.

18. A device as set forth in claim 17 in which there is included single control means for actuating both of said means to vary the orbit of travel of the planet gear and said means varying the effective pitch diameter of the one-piece split ring reaction gear.

19. A device as set forth in claim 17 in which the means to vary the orbit of travel of the planet gear includes plural eccentric members.

20. A device as set forth in claim 17 in which the means varying the effective pitch diameter of the one piece split ring reaction gear includes a calibrated rod member indicating full teeth adjustment of said one piece split ring reaction gear.

References Cited in the file of this patent
UNITED STATES PATENTS 2,825,244    Luthi _____ Mar. 4, 1958